United States Patent [19]

Needham

[11] Patent Number: 5,260,381

[45] Date of Patent: Nov. 9, 1993

[54] CROSSLINKABLE POLYETHYLENE-BASED COMPOSITION FOR ROTATIONAL MOLDING

[75] Inventor: Donald G. Needham, Ramona, Okla.

[73] Assignee: Neeco, Inc., Ramona, Okla.

[21] Appl. No.: 774,564

[22] Filed: Oct. 8, 1991

[51] Int. Cl.⁵ .................. C08L 23/26; C08L 23/04
[52] U.S. Cl. .................. 525/193; 525/222; 524/524
[58] Field of Search .................. 525/222, 193

[56] References Cited

U.S. PATENT DOCUMENTS

| | | | |
|---|---|---|---|
| 3,214,422 | 10/1965 | Mageli et al. | 260/94.9 |
| 3,399,250 | 8/1968 | Kirk et al. | 525/222 |
| 3,784,668 | 1/1974 | Neidinger | 525/222 |
| 3,862,265 | 1/1975 | Steikamp et al. | 260/878 |
| 3,876,613 | 4/1975 | Needham et al. | 260/45.855 |
| 3,974,114 | 8/1976 | Sowa | 260/23 H |
| 4,032,600 | 6/1977 | MacAdams | 525/222 |
| 4,187,212 | 2/1980 | Zinke et al. | 260/45.8 |
| 4,267,080 | 5/1981 | Yokoyama et al. | 260/4 |
| 4,582,656 | 4/1986 | Hoffmann | 525/222 |
| 4,900,792 | 2/1990 | Chen et al. | 525/264 |

FOREIGN PATENT DOCUMENTS

| | | | |
|---|---|---|---|
| 87210 | 8/1983 | European Pat. Off. | |
| 74035335 | 9/1974 | Japan | 525/222 |
| 7101400 | 8/1972 | Netherlands | 525/222 |

Primary Examiner—Carman J. Seccuro, Jr.
Attorney, Agent, or Firm—Timothy R. Kroboth

[57] ABSTRACT

A cross-linkable polyethylene-based composition useful for rotational molding and, when cured, characterized by exceptional percent elongation after long term exposure to degradation conditions, is provided. The cured composition has a high degree of crosslinking which may be a more random type of crosslinking.

20 Claims, No Drawings

CROSSLINKABLE POLYETHYLENE-BASED COMPOSITION FOR ROTATIONAL MOLDING

This invention relates to thermoplastic polymers of ethylene fabricated into useful products, by rotational molding.

BACKGROUND OF THE INVENTION

Rotational Molding, more commonly known as Rotomolding, is generally used for molding hollow articles, like toys, sports equipment, fuel tanks, playground equipment, tanks for use in agriculture, refuse containers, and large chemical tanks. In use, many of these products are left out-of-doors, unprotected against the weathering elements of rain, heat, and ultraviolet light rays, from the sun.

For Rotomolding a part, powdered polyethylene or other plastic resin is placed inside a hollow mold, which is then closed and rotated, on two axes, inside a heated oven to allow the powder to fuse together, forming a solid, hollow mass on the inside of the mold. The mold is then removed from the oven, to cool by air or water spray. After cooling, the molded part is removed, and more powder is placed inside the mold to begin another cycle. A more detailed discussion of rotomolding may be found in Modern Plastics Encyclopedia 1990, pages 317–318.

Polymers of ethylene, including homopolymers and copolymers, are often used in the rotomolding process. Into these polymers are frequently incorporated thermal stabilizers, ultraviolet absorbers, and crosslinking agents. Known thermal stabilizers include a combination of thioesters, disclosed in U.S. Pat. No. 2,956,982, with an organophosphite and a hindered phenolic antioxidant. Some combinations of organophosphite and hindered phenolic antioxidant are disclosed in U.S. Pat. No. 4,187,212. Known ultraviolet stabilizers include 2-Hydroxy-4-n-Octoxybenzophenone, and a hindered amine, like poly[(6-morpholino-s-triazine2,4diyl)[2,2,6,6-tetramethyl-4-piperidyl)imino]-hexamethylene[(2,2,6,6-tetramethyl-4-piperidyl)imino]] or hindered amine, bis(2,2,6,6-tetramethylpiperidine-4)sebacate, used separately or in combination.

Crosslinking agents include a combination of organic peroxide initiator and a crosslinking co-agent. This combination is disclosed in U.S. Pat. No. 4,900,792 assigned to Allied-Signal and European Patent 0087210 assigned to DuPont Canada. For rotomolding, dialkyl peroxides used are 2,5-dimethyl-2,5-di (t-butylperoxy)-hexane or a,a'bis(t-butylperoxy)diisopropylbenzene or those disclosed in U.S. Pat. No. 3,214,422. Of those disclosed in the patent, 2,5-dimethyl-2,5-di (t-butylperoxy)hexyne$^3$ is most commonly used. Co-agents used by those experienced in the art of crosslinking polyethylene include triallyl cyanurate, triallyl isocyanurate, trimellitate, trimetholpropane trimethacrylate, and related monomers.

SUMMARY OF THE INVENTION

The present invention is a crosslinkable polyethylene based composition, to be used for Rototational Molding of articles, which have improved long term properties.

The polyethylene base resin is a homopolymer, co-polymer, or a combination of both. The composition beneficially includes an organic peroxide initiator, an ethylene vinyl acetate copolymer, and a suitable crosslinking co-agent. Thermal stabilizers, and one or more ultraviolet stabilizers are advantageously added.

This invention is particularly suited for Rotomolding applications, which require long term thermal stability and resistance to ultraviolet light induced photodegradation.

This crosslinkable polyethylene based composition is of special value, for rotomolded articles, which will be exposed out-of-doors for an extended period of time.

DESCRIPTION OF THE PREFERRED EMBODIMENT

This present invention relates to a novel polyethylene and ethylene copolymer composition, which has superior long term physical properties. This composition is most suitable for rotomolding products, which will be exposed out-of-doors for an extended period of time.

Those polymers desired for this invention are thermoplastic polymers of ethylene. Polyethylene homopolymers, ethylene copolymers, and a mixture of both, are suitable for the crosslinkable compositions of this invention.

The olefin polymer, used in this invention, may be an ethylene homopolymer or ethylene copolymer comprised of a major part of ethylene monomer. Typically at least 75%, by weight, ethylene monomer will be used. Useful monomers for minor part of the polyethylene based resin include a C3–C8 alpha-olefin, typically an acyclic straight or branched chain olefin such as octene, hexene, or butene.

Polyethylene homopolymer and ethylene copolymer compositions, for rotomolding applications, are well known and described in U.S. Pat. Nos.: 3,876,613; 3,974,114; and EP 87210.

Preferred properties of the polyethylene base resin is a melt index of 10 to 50, preferably within the range of 10 to 30 gm/10 minutes, as determined by ASTM D1238, condition "E". A suitable density is in the range of 0.920 to 0.970, preferably within the range of 0.930 to 0.960 gm/cc, as determined by the ASTM 1505 testing procedure.

Suitable crosslinking compounds are described in U.S. Pat. No. 3,214,422, issued to Mageli et al on Oct. 26, 1965. These compounds are acetylenic dieperoxy compounds and include well known hexynes, and octynes. Among the compounds are included:

2,7-Dimethyl-2,7-di(t-butylperoxy)octadiyne-3,5
2,7-Dimethyl-2,7-di(peroxy ethyl carbonate)octadiyne-3,5
3,6-Dimethyl-3,6-di(peroxyethyl carbonate)octyne-4
3,6-Dimethyl-3,6-(t-butylperoxy)octyne-4
2,5-Dimethyl-2,5-di(peroxybenzoate)hexyne-3
2,5-Dimethyl-2,5-di(peroxy-n-propyl carbonate)hexyne-3
2,5-Dimethyl-2,5-di(peroxy isobutyl carbonate)hexyne-3
2,5-Dimethyl-2,5-di(peroxy ethyl carbonate)hexyne-3
2,5-Dimethyl-2,5-di(alpha-cumyl peroxy)hexyne-3
2,5-Dimethyl-2,5-di(peroxy beta-chloroethyl carbonate)hexyne-3
2,5-Dimethyl-2,5-di(t-butylperoxy)hexyne-3.

Other suitable organic peroxide initiators are 2,5-Dimethyl2,5-di(t-butylperoxy)hexane or a,a'bis(t-butylperoxy)diisopropylbenzene. The amount of the initiator will usually be in the range of from 0.1 to 2 parts by weight, preferably within the range of 0.3 to 1 part by weight, based on 100 parts by weight of ethylene polymer.

The composition of the present invention includes a graft-effecting polymer which is beneficially an ethylene vinyl ester copolymer such as ethylene vinyl acetate. It is believed that the outstanding properties described hereinafter, flow from the graft-effecting polymer. Vinyl acetate content of the ethylene copolymer should be in the range of from 5 to 50 percent, preferably in the range of from 8 to 15 percent vinyl acetate. The more preferred graft-effecting polymer is in the range of 9 to 10 percent vinyl acetate. A suitable amount of the graft-effecting polymer used in this composition, is in the range of 0.1 to 4 parts, by weight, preferably within the range of 0.2 to 2 parts, by weight, based on 100 parts of ethylene polymer. The melt index of the graft-effecting polymer should be in the range of 1 to 50, preferably within the range of 2 to 10 gm/10 minutes for better dispersion into the ethylene polymer base resin.

Crosslinking co-agents for use in this composition include allyl crosslinking co-agents and trimethacrylate compounds. Allyl carboxylates may be used. The allyl crosslinking co-agents may be allyl, diallyl, and triallyl compounds. Preferred crosslinking co-agents are triallyl cyanurate, triallyl isocyanurate, triallyl trimellitate, and trimethylolpropane trimethacrylate. The amount to be used will vary according to the amount of other components in the composition. A preferred amount of crosslinking co-agent will be in the range of 0.1 to 2 parts, preferably in the range of 0.2 to 1 part, by weight, per 100 parts of ethylene polymer.

Thermal stabilizers are advantageously included in the present invention. Suitable thermal stabilizers for this composition are a thioester, an organophosphite, and a hindered phenolic antioxidant. These stabilizers may be used separately or in combination. A preferred thermal stabilizer system is a combination including a thioester which may be dilauryl thiodipropionate (DLTDP) or distearyl thiodipropionate (DSTDP). A preferred thioester is DLTDP in an amount of between 0.02 to 0.5 parts, preferably between 0.05 to 0.15 parts by weight, based on 100 parts of polyethylene base resin. The second part of this combination is an organophosphite. Suitable phosphites are tris(2,4-dit-butylphenyl)phosphite (I-168), trilauryl trithio phosphite (TLTTP), and bis(2,4-di-t-butylphenyl) pentaerythritol diphosphite (MDW-626). Of these phosphites I-168 is preferred in an amount ranging from 0.02 to 2 parts, preferably between 0.05 to 0.5 parts by weight, based on 100 parts of ethylene polymer. The third part of this combination is a hindered phenolic antioxidant. A preferred hindered phenolic antioxidant is tetrakis[methylene-3-(3,5-di-t-butyl-4hydroxyphenyl) propionate] methane (I-1010) or octadecyl-3-(3,5-di-t-butyl-4-hydroxy phenyl) propionate (I-1076). A preferred hindered phenolic antioxidant is I-1076 and a preferred amount is in the range of 0.01 to 0.1 parts, with the more preferred range of 0.02 to 0.05 parts by weight based on 100 parts of polyethylene base resin. A most preferred thermal stabilizer is a combination of DLTDP, I-168, and I-1076, for the crosslinkable polyethylene composition, of the present invention.

The present invention includes ultraviolet stabilizers. Suitable ultraviolet stabilizers include both benzophenone absorbers and hindered amine light stabilizers. These are frequently used separately, but are more effective when used in combination. A preferred benzophenone absorber is, 1-hydroxy-4-n-octoxybenzophenone (UV-531), in an amount of between 0.1 to 1 part, preferably between 0.3 to 0.5 parts by weight based on 100 parts of ethylene polymer base resin. A preferred hindered amine light stabilizer (HALS) is, but not limited to poly[(6-morpholinos-triazine-2,4diyl) [2,2,6,6-tetramethyl4-piperidyl)imino]hexamethylene [(2,2,6,6-tetramethyl-4piperidyl)imino]] (UV3346), or HALS, bis(2,2,6,6-tetramethylpiperidine4) sebacate (T-770). A preferred HALS for the crosslinkable composition is UV-3346, in an amount, in the range of 0.05 to 0.5 parts, preferably between 0.1 to 0.3 parts by weight, based on 100 parts by weight of ethylene polymer base resin. A combination of both benzophenone and HALS are preferred in the crosslinkable composition.

Other additives which may also be incorporated into the crosslinkable polyethylene composition include organic and inorganic colorants, anti-static agents, stearic acid and conventional processing aids, wax and fatty acid lubricants, and mineral fillers.

EXAMPLES

Examples in TABLE I, samples 1–12 are crosslinkable polyethylene compositions, which were melt compounded in an extruder, pelletized, ground to ±35 mesh powder, then rotomolded, in a 6"×6"×8" box mold. The wall thickness, of the molded box, was ±0.125". Test specimens were die-cut from the box for testing physical properties. The thermal stabilizers in these compounds are 0.02 part I-1076 plus 0.1 part I-168 plus 0.05 part DLTDP. The ultraviolet stabilizers in these compounds are 0.1 part UV-3346 plus 0.3 part UV-531. These compounds also contain 0.05 part calcium stearate, as a processing aid, to reduce surface tension. All parts are by weight and are based on 100 parts of polyethylene base resin.

Samples 1–6 of TABLE I are comparative to illustrate the effect of using EVA and TAC separately in a crosslinkable polyethylene composition. The physical properties of these compounds would not be adequate for many of the commercial rotomolding applications.

Samples 7–12 in TABLE I are crosslinkable polyethylene compositions of the present invention. These samples illustrate the improved physical properties which are obtainable by combining TAC, a well known crosslinking co-agent, with EVA, a graft-effecting polymer of the instant invention. The gel, elongation, and impact, of samples 8–12 are greatly improved. The amount of TAC and EVA in sample 7 were not sufficient to obtain a high degree of crosslinking.

Elongation as measured by ASTM D638, is considered to be a key property of rotomolded articles. A high elongation is desired, as it is an indication of high ductility and good impact strength.

The improved physical properties and higher degree of crosslinking, as measured by Gel, are due to the vinyl acetate in this composition. Vinyl acetate is believed to create an environment for additional crosslinking from second and third generation reactions with a more random type of crosslinking or graft.

As shown in TABLE II, the high elongation is maintained after long term exposure to degradation conditions. The term "graft-effecting polymer" is intended to describe a polymer such as ethylene vinyl acetate, which provides a more random type of crosslinking sufficiently strong to maintain the high elongation after such long term exposure.

TABLE I

| SAMPLE | EVA | TAC | GEL (%) | ELONGATION (%) | IMPACT (ft/lb) |
|---|---|---|---|---|---|
| 1 | — | — | 54 | 160 | <20 |
| 2 | — | 0.1 | 74 | 210 | 30 |
| 3 | — | 0.2 | 83 | 235 | 35 |
| 4 | 0.1 | — | 59 | 200 | <20 |
| 5 | 0.2 | — | 65 | 260 | 30 |
| 6 | 0.3 | — | 68 | 285 | 45 |
| 7 | 0.1 | 0.1 | 74 | 260 | 35 |
| 8 | 0.2 | 0.1 | 80 | 285 | 45 |
| 9 | 0.3 | 0.1 | 82 | 285 | 50 |
| 10 | 0.1 | 0.2 | 85 | 320 | 60 |
| 11 | 0.2 | 0.2 | 88 | 415 | 65 |
| 12 | 0.3 | 0.2 | 92 | 640 | 75 |

Resin: Occidental Chemical Corporation
Polyethylene Homopolymer—TYPE: Alathon 7050
Density—0.961 gm/cc. Melt Index—17.3 gm/10 min.
Peroxide: 2,5-Dimethyl-2,5-di(t-butylperoxy)hexyne-3 0.6 parts by weight.
EVA=Ethylene/vinyl acetate copolymer.
Melt Index—8 gm/10 min. Vinyl Acetate—9%.
TAC=Triallyl Cyanurate.
Testing: ASTM-D2765 Test Procedure for Gel—Percent.
ASTM D638 Test Procedure for Elongation—Percent.
ARM Test Procedure for Impact at −40°.
All parts are based on 100 parts of Alathon base resin.

Examples in TABLE II, Runs 1-7 are crosslinkable polyethylene compositions, which were melt compounded in an extruder, pelletized, ground to ±35 mesh powder, then rotomolded, in a 6"×6"×8" box mold. The wall thickness, of the molded box, was ±0.125 inches. Test specimens were die-cut from the box for testing physical properties.

The UVX samples were compression molded, using a hydraulic press, heated to 420° F. These samples were molded from the 35 mesh powder. Test specimens were die-cut from 0.035" sheets.

The thermal stabilizers, in these compounds, are 0.1 part I-168 plus 0.05 part DLTDP. The ultraviolet stabilizers, in these compounds are 0.1 part UV-3346 plus 0.3 part UV-531.

No stearate additive is used, as additive of this type is unnecessary; accordingly it will be understood that a composition in accordance with the present invention may be free of a fatty acid metal salt, as described in U.S. Pat. No. 3,974,114 to Sowa and U.S. Pat. No. 4,900,792 assigned to Allied-Signal.

Runs 1-3 of TABLE II are comparative to illustrate the effect of using EVA and TAC separately in a crosslinkable polyethylene composition. The physical properties of Runs 1-3 would not be considered adequate for most rotomolding applications. The crosslinking bonds are too weak and the elongation drops sharply when these molded parts are exposed to an elevated temperature or ultraviolet light. Runs 4-7 of TABLE II are crosslinkable polyethylene compositions of the present invention. These runs illustrate the improved long term physical properties which are obtained when using a very preferred amount, that is, 0.4 to 1 part by weight, of a graft-effecting polymer in accordance with present invention, in combination with a very preferred amount, that is, 0.4 to 1 part by weight, of a crosslinking co-agent.

In contrast, 1,2-polybutadiene as the crosslinking co-agent in an amount up to 1 part, did not produce adequate long term properties. Accordingly a crosslinkable polyethylene composition in accordance with the present invention would not beneficially include 1,2-polybutadiene. See U.S. Pat. No. 4,267,080 to Yokoyama, in which the crosslinking aid may be 1,2-polybutadiene. Additionally, it would not be beneficial to include 5 to 50 parts by weight of a rubber or elastomer, as taught by Yokoyama.

Oven aging in a forced-draft oven, at 140° F., is considered to be an accelerated test for measuring thermal stability. UVX is an accelerated test, of high intensity ultraviolet light, in the range of 310-320 nanometers, where polyethylene is most sensitive to ultraviolet light induced photodegradation.

Elongation as measured by ASTM D638, is considered to be a key property of rotomolded articles. A high elongation is desired, as it is an indication of high ductility and good impact strength. As can be seen from TABLE II, the composition of this invention shows a significant improvement in long term properties.

Other useful graft-effecting polymers include ethylene-propylene-diene terpolymer, such as may be purchased from Uniroyal Chemical Company as EPDM—polyethylene concentrate in pellet form, sold as Royalene 7200. This type of high ethylene polymer typically includes an about 75 to 25 weight ratio of ethylene to propylene monomer.

The distinguishing feature of my crosslinkable polyethylene composition is that, when cured, it provides for an elongation greater than 200% after long term exposure to elevated temperature or high intensity ultraviolet light. By long term exposure is meant 2000 hours (elevated temperature, at 140° F.) or 1000 hours (high intensity ultraviolet light, in the range of 310-320 nanometers). Preferably, the elongation, after long term exposure to such degradation conditions is greater than about 300 percent.

In contrast, the elongation of the commercial resins of TABLE III is found to drop sharply when evaluated after long term exposure to elevated temperature or high intensity ultraviolet light.

TABLE II

| RUN | Co-agent | Graft | Physical Properties Impact (ft/lb) | Physical Properties Elongation | Long Term OVEN AGING 2000 hours Elongation | Properties UVX 1000 hours Elongation |
|---|---|---|---|---|---|---|
| 1 | — | — | <10 | 95% | <10% | <10% |
| 2 | — | EVA | <20 | 150 | 20 | 45 |
| 3 | TAC | — | 45 | 290 | 60 | 160 |
| 4 | TAC + | EVA | >60 | >500 | 395 | 375 |
| 5 | SR350 + | EVA | >60 | >500 | 280 | 325 |
| 6 | TAIC + | EVA | >60 | >500 | 425 | 410 |
| 7 | TATM + | EVA | >60 | >500 | 485 | 425 |

Resin: Mobil Chemical Company
Polyethylene Copolymer—Ethylene/Hexene
TYPE: Mobil HMA-047
Density—0.953 gm/cc. Melt Index—20.2 gm/10 minutes.
Peroxide: 2,5-Dimethyl-2,5-di(t-butylperoxy)hexyne-3 0.6 parts by weight.
EVA: Ethylene/Vinyl Acetate copolymer.
Melt Index—8 gm/10 min. Vinyl acetate—9%.
TAC: Triallyl Cyanurate.
SR350: Trimethylolpropane Trimethacrylate.
TAIC: triallyl Isocyanurate.
TATM: Triallyl Trimellitate.
OVEN AGING: Forced Draft oven at 140° F.
UVX: 0.035" Thick specimens, exposed to high intensity ultraviolet light at 310–320 nanometers. Compression molded test specimens.
EVA and Co-agents: Amount of each are 0.5 parts by weight based on 100 parts by weight of Mobil base resin.

TABLE III

| | | Physical Properties | | | Long Term OVEN AGING | Properties UVX |
|---|---|---|---|---|---|---|
| SAMPLE | RESIN | Impact (ft/lb) | Gel | Elongation | 2000 hours Elongation | 1000 hours Elongation |
| 1 | Allied-Signal Paxon 7004 | 55 | 82% | 385% | <20% | 125% |
| 2 | DuPont Canada Sclairlink 8000 | 50 | 84 | 395 | 35 | 85 |

Paxon 7004 and Sclairlink 8000 are crosslinkable polyethylene-based compositions sold in powder form, ready for use in rotomolding.
The DuPont resin is no longer commercially available.
TESTING:
ARM Test procedure for Impact at −40°.
ASTM-D2765 Test procedure for Gel—Percent.
ASTM-D638 Test procedure for Elongation—Percent.
OVEN AGING: Forced Draft oven at 140° F.
UVX: Compression molded test specimens, 0.035" thickness.
Exposed to high untensity ultraviolet light at 310–320 nanometers.

What is claimed is:

1. A crosslinkable polyethylene-based, rotomolding composition comprising a thermoplastic polymer of ethylene selected from the group consisting of an ethylene homopolymer, an ethylene copolymer comprising a C3-C8 alpha-olefin, and mixtures thereof, said ethylene homopolymer and copolymer each having a density in the range of about 0.92 to 0.97 gm/cc;
   a crosslinking amount of an organic peroxide initiator;
   from about 0.2 to 4 parts by weight based on 100 parts of the ethylene polymer, of a graft-effecting, ester group-bearing, ethylenic polymer providing for elongation greater than about 200% after long term exposure of the cured rotomolding composition, in the form of an ethylene/vinyl ester copolymer; and
   from about 0.2 to 1 parts by weight based on 100 parts of the ethylene polymer, of a suitable crosslinking co-agent.

2. The composition of claim 1, wherein said graft-effecting polymer is an ethylene/vinyl acetate copolymer with a vinyl acetate content of from about 5 to 50% by weight.

3. The composition of claim 1, wherein said graft-effecting polymer has a melt index of from about 2 to 10 gm/10 minutes.

4. The composition of claim 1, wherein said graft-effecting polymer is present in an amount ranging from about 0.2 to 2 parts by weight.

5. The composition of claim 1, wherein said crosslinking co-agent is present in an amount of from about 0.4 to 1 part by weight.

6. The composition of claim 1, wherein said graft-effecting polymer is present in an amount ranging from about 0.4 to 1 part by weight, and said crosslinking co-agent is present in an amount of from about 0.4 to 1 part by weight.

7. The composition of claim 1, wherein said crosslinking coagent is an allyl crosslinking co-agent selected from the group consisting of triallyl cyanurate, triallyl isocyanurate and triallyl trimellitate.

8. The composition of claim 1, wherein said crosslinking co-agent is a trimethacrylate compound.

9. The composition of claim 1, further comprising an ultraviolet degradation stabilizing amount of at least one suitable ultraviolet stabilizer.

10. The composition of claim 1, further comprising a thermal degradation stabilizing amount of at least one suitable thermal stabilizer.

11. The composition of claim 1, wherein said organic peroxide initiator is an acetylenic polyperoxy compound.

12. The composition of claim 1, wherein the ethylene polymer has a melt index of from about 10 to 50 gm/10 min.

13. The composition of claim 1, wherein said ethylene homopolymer and copolymer each have a density in the range of about 0.93 to 0.96 gm/cc.

14. The composition of claim 2, wherein said ethylene/vinyl acetate copolymer has a vinyl acetate content of about 8 to 15% by weight.

15. The composition of claim 1, wherein said crosslinking co-agent is selected from an allyl crosslinking co-agent and a trimethacrylate compound.

16. A crosslinkable polyethylene-based, rotomolding composition comprising a thermoplastic polymer of ethylene selected from the group consisting of an ethylene homopolymer, an ethylene copolymer comprising a C3-C8 alpha-olefin, and mixtures thereof, said ethylene homopolymer and copolymer each having a density in the range of about 0.92 to 0.97 gm/cc;
   a crosslinking amount of an organic peroxide initiator;
   from about 0.2 to 4 parts by weight based on 100 parts of the ethylene polymer, of a graft-effecting, polymeric ester providing for elongation greater than about 200% after long term exposure of the cured rotomolding composition, in the form of an ethylene/vinyl ester copolymer; and from about 0.2 to 1 parts by weight based on 100 parts of the ethylene polymer, of a suitable crosslinking co-agent selected from an allyl crosslinking co-agent and a trimethacrylate compound.

17. The composition of claim 16, wherein said graft-effecting polymeric ester is an ethylene/vinyl acetate copolymer with a vinyl acetate content of from about 5 to 50% by weight.

18. The composition of claim 16, wherein said graft-effecting polymeric ester is present in an amount ranging from about 0.4 to 1 part by weight, and said crosslinking co-agent is present in an amount of from about 0.4 to 1 part by weight.

19. The composition of claim 16, wherein said crosslinking co-agent is an allyl crosslinking co-agent selected from the group consisting of triallyl cyanurate, triallyl isocyanurate and triallyl trimellitate.

20. The composition of claim 17, wherein said ethylene/vinyl acetate copolymer has a vinyl acetate content of about 8 to 15% by weight.

* * * * *